US010260840B2

(12) United States Patent
Baker et al.

(10) Patent No.: US 10,260,840 B2
(45) Date of Patent: Apr. 16, 2019

(54) MOBILE BALLISTICS PROCESSING AND DISPLAY SYSTEM

(71) Applicant: GeoBallistics, LLC, Irving, TX (US)

(72) Inventors: Joe D. Baker, Richardson, TX (US); Jeffrey P. Barstad, McKinney, TX (US)

(73) Assignee: GeoBallistics, LLC, Irving, TX (US)

(*) Notice: Subject to any disclaimer, the term of this patent is extended or adjusted under 35 U.S.C. 154(b) by 153 days.

(21) Appl. No.: 14/599,894

(22) Filed: Jan. 19, 2015

(65) Prior Publication Data
US 2016/0163080 A1 Jun. 9, 2016

Related U.S. Application Data

(60) Provisional application No. 62/088,244, filed on Dec. 5, 2014, provisional application No. 61/973,267, filed
(Continued)

(51) Int. Cl.
G09G 5/00 (2006.01)
F41G 9/00 (2006.01)
(Continued)

(52) U.S. Cl.
CPC .............. F41G 9/00 (2013.01); F41G 3/02 (2013.01); F41G 3/06 (2013.01); F41G 3/08 (2013.01);
(Continued)

(58) Field of Classification Search
None
See application file for complete search history.

(56) References Cited

U.S. PATENT DOCUMENTS 4,951,901 A * 8/1990 Dunne .................. F42B 10/661
244/3.11
5,631,654 A 5/1997 Karr
(Continued)

FOREIGN PATENT DOCUMENTS

WO 2013002856 A2 1/2013

OTHER PUBLICATIONS

TwoMinuteTeacher, "Projectile motion—part 1—lesson", published on Feb. 23, 2010, retrieved from https://www.youtube.com/watch?v=d6f3K0Gw02l on May 1, 2018.*
(Continued)

Primary Examiner — Zhengxi Liu
(74) Attorney, Agent, or Firm — Hilton IP Law, PLLC; Zachary W. Hilton

(57) ABSTRACT

A mobile ballistics processing and display system for receiving data associated with one or more ballistics variables, for processing such variables, and for displaying a ballistics solution associated with such variables in an easily and quickly understandable map format. One or more ballistics variables are inputted into a mobile computing device or are otherwise acquired by such device. Projected in-flight projectile characteristics are calculated by the computing device based upon ballistics variables. Users are provided with the ability to input in-flight bullet characteristics criteria into the computing device. The computing device is configured to depict in map format, projected paths of a projectile from one or more shooter locations to one or more target locations. Differing graphical representations of the projected path of the projectile may be displayed, depending on how the projected in-flight projectile characteristics compare to the in-flight projectile characteristics criteria at each step of the projected path.

20 Claims, 12 Drawing Sheets

Related U.S. Application Data on Apr. 1, 2014, provisional application No. 62/023,147, filed on Jul. 10, 2014.

(51) Int. Cl.
  *G06K 9/00* (2006.01)
  *F41G 3/02* (2006.01)
  *F41G 3/06* (2006.01)
  *F41G 3/08* (2006.01)

(52) U.S. Cl.
  CPC ......... *G06K 9/00476* (2013.01); *G09G 5/003* (2013.01); *G09G 2370/02* (2013.01)

(56) References Cited

U.S. PATENT DOCUMENTS

| | | | |
|---|---|---|---|
| 5,781,505 A * | 7/1998 | Rowland | F41J 5/06 367/124 |
| 6,718,263 B1 * | 4/2004 | Glass | G07B 15/02 455/428 |
| 7,526,403 B2 | 4/2009 | Hogan | |
| 7,856,750 B2 | 12/2010 | Sammut | |
| 8,172,139 B1 | 5/2012 | McDonald | |
| 8,281,995 B2 | 10/2012 | Bay | |
| 8,282,493 B2 | 10/2012 | Roman | |
| 8,414,298 B2 | 4/2013 | D'Souza | |
| 8,523,185 B1 | 9/2013 | Gilbreath | |
| 8,556,752 B2 | 10/2013 | Meadows | |
| 8,701,330 B2 | 4/2014 | Tubb | |
| 2010/0201620 A1 | 8/2010 | Sargent | |
| 2010/0225535 A1 | 9/2010 | Li | |
| 2011/0261193 A1 * | 10/2011 | Agurok | F41H 13/00 348/135 |
| 2011/0315767 A1 | 12/2011 | Lowrance | |
| 2012/0097741 A1 | 4/2012 | Karcher | |
| 2012/0118955 A1 | 5/2012 | Cox | |
| 2012/0126002 A1 | 5/2012 | Rudich | |
| 2012/0329538 A1 | 12/2012 | Hall | |
| 2013/0047485 A1 | 2/2013 | Tubb | |
| 2013/0105579 A1 * | 5/2013 | Miller | F41G 3/04 235/400 |
| 2013/0193645 A1 | 8/2013 | Kazakov | |
| 2013/0333266 A1 | 12/2013 | Gose | |
| 2013/0344461 A1 | 12/2013 | Tello | |
| 2014/0063261 A1 | 3/2014 | Betensky | |
| 2014/0081608 A1 | 3/2014 | McLemore | |
| 2014/0110482 A1 | 4/2014 | Bay | |
| 2014/0124575 A1 | 5/2014 | Millett | |
| 2014/0163868 A1 * | 6/2014 | Huang | G01C 21/206 701/425 |
| 2014/0305025 A1 * | 10/2014 | Tubb | F41G 1/473 42/130 |
| 2015/0176948 A1 * | 6/2015 | Varshneya | F41G 3/08 235/404 |

OTHER PUBLICATIONS

Lee W. Young, International Search Report and Written Opinion of the International Searching Authority in connection with Applicants' Application No. PCT/US15/23931, WIPO, dated Jan. 4, 2016.

Applied Ballistics LLC, Applied Ballistics Mobile Application appearing at website <http://appliedballisticsllc.com//AB_app.htm>, screenshot dated Nov. 18, 2014.

Mark Karhl, Range Card software application description appearing at website <http://play.google.com/store/apps/details?id=card.range&hl=en>, screenshot dated Nov. 18, 2014.

Applied Ballistics LLC, Description of Kestrel device appearing at website <http://store.appliedballisticsllc.com/ProductDetails.asp?ProductCode=3001>, screenshot dated Nov. 18, 2014.

* cited by examiner

| Range | Elevation | | Windage | | Velocity | Energy | MVR | ToF |
|---|---|---|---|---|---|---|---|---|
| | in | MOA | MOA | mil | fps | ft/lbs | 4" | sec |
| | | mil | in | | | | | |
| 100 | | | | | 2760 | | | |
| 200 | | | | | 2625 | | | |
| 300 | | | | | 2494 | | | |
| 400 | | | | | 2366 | | | |
| 500 | | | | | 2242 | | | |
| 600 | | | | | | | | |
| 700 | | | | | | | | |
| 800 | | | | | | | | |
| 900 | | | | | | | | |
| 1000 | | | | | | | | |

FIG. 12

MOBILE BALLISTICS PROCESSING AND DISPLAY SYSTEM

CROSS REFERENCE TO RELATED APPLICATIONS

This application claims the benefit of U.S. Provisional Application No. 62/088,244, filed Dec. 5, 2014, which is incorporated by reference herein.

BACKGROUND OF THE INVENTION

Technical Field

The present invention relates generally to the electronic processing and display of projectile ballistics solutions and more specifically, to systems and methods for acquiring data associated with a plurality of ballistics parameters from a user and both local and/or remote data sources, processing such data to generate one or more ballistics solutions, and displaying such solutions including, but not limited to, a graphical representation of approximate in-flight projectile characteristics to a user in an intuitive format.

Description of Related Art

Projectile ballistics processing, involving both computer calculations and calculations performed by persons without the aid of a computing device, is known in the art. In the earliest years of mankind, projectile ballistics solutions were calculated by people using their instinctual knowledge of the laws of motion that they observed in day-to-day life. As time progressed, humans gained further knowledge concerning the laws of motion and the various variables that affect projectile trajectories, allowing them to make ever-increasingly more complex ballistics calculations that resulted in them achieving greater accuracy.

With the invention and widespread adoption of electronic computing devices, capable of performing many billions of calculations per second, it became possible to calculate ballistics solutions, even involving numerous variables changing over time and space, in very compressed time periods. Moreover, as the physical size of computing devices decreased over time, it became possible to utilize mobile personal computers to perform such calculations in the field. Such electronic calculation of ballistics solutions has useful applications in numerous fields including, just by way of limited examples, astrodynamics, forensic analysis, missile guidance, and firearms marksmanship. As discussed further below, the teachings herein are applicable with respect to all manner of ballistics. However, for the purposes of describing the inventions claimed herein, exemplary embodiments will be explained in the context of a mobile computing device capable of electronically calculating and displaying bullet ballistics involving the use of a firearm operated by a single user/shooter. It is contemplated that in alternate embodiments, two or more users could simultaneously utilize the mobile ballistics processing and display system taught herein.

In prior art applications capable of processing ballistics solutions in connection with the use of firearms projectiles, such applications typically utilize a plurality of variables affecting bullet trajectory. A ballistics solution is typically then calculated with reference to a particular shooter's initial calibration of a firearm for a particular bullet. For example, if a shooter's rifle, using a particular bullet/cartridge and a particular optic or other sighting device mounted on the firearm, is configured to be "zeroed" (meaning that the point of impact of the bullet on a target is the same location as the line of sight of the rifle at the target ("aim point")) at a predetermined "zero" range between the shooter and the target, prior art ballistics solutions typically provide distances (with respect to the target) by which the firearm operator may adjust the line of sight such that the actual point of impact of the bullet will be as desired at distances greater or lesser than the aforementioned "zero" distance. Such adjustments are typically made by physically moving the aim point as seen through a firearm optic sight but may also be made by modifying the firearm optics.

Such physical adjustments to the aim point (commonly called "hold over" and "hold under") are typically expressed in terms of "up" and "down" with respect to elevation adjustments, and "left" and "right" with respect to windage adjustments. Such adjustments are typically expressed in units such as inches, centimeters, minutes of angle (MOA) and milliradians (Mil). Prior art systems for calculating ballistics solutions typically display such adjustments in numeric form alone for a particular distance to target, or in the form of a ballistics table showing adjustments and/or bullet characteristics for a multitude of target distances. In some prior art ballistics solutions systems, such adjustments for a particular distance to target are displayed within a firearm optic so as to be visible to the shooter.

While prior art electronic systems for calculating and displaying ballistics solutions offer some advantages, especially as compared to ballistics calculation methods employed without the use of computing devices, there are many drawbacks and other limitations inherent in such prior art systems. One drawback of such prior art electronic systems is that they fail to display accurate real-time geographic information pertaining to the shooter's surroundings, which would provide a shooter with increased information regarding his or her location, the location of target(s), and the location of other objects or terrain features in the field that could aid in more accurate bullet placement, and/or assist in identifying alternate shooting locations that might provide for more ideal conditions from which to take a shot. Another drawback of prior art electronic systems for processing and displaying ballistics solutions is that they fail to display a graphical representation of approximate in-flight bullet characteristics (including such bullet characteristics with reference to predetermined user criteria/variables) to a shooter in an easily and quickly comprehensible format.

Accordingly, a long-felt but unaddressed need in the prior art is for a mobile ballistics processing and display system that provides users with accurate real-time geographic information pertaining to the user's surroundings. Another long-felt but unaddressed need in the prior art is for an electronic ballistics processing and display system that displays a graphical representation of approximate in-flight bullet characteristics (including such bullet characteristics with reference to predetermined user criteria/variables) to a shooter in an easily and quickly comprehensible format. As described in further detail below, the inventions disclosed herein provide these and other long-felt but unmet needs in the art.

BRIEF DESCRIPTION OF THE SEVERAL VIEWS OF THE DRAWINGS

The novel features believed characteristic of the inventions are set forth in the appended claims. The inventions themselves, however, as well as preferred modes of use, further advantages thereof, will be best understood by reference to the following detailed description of illustrative embodiments when read in conjunction with the accompanying drawings, wherein:

FIG. 12 illustrates a screenshot of a display of an embodiment of the mobile ballistics processing and display system, said display showing a ballistics table on which data resulting from ballistics solution processing is displayed.

Figure 1:
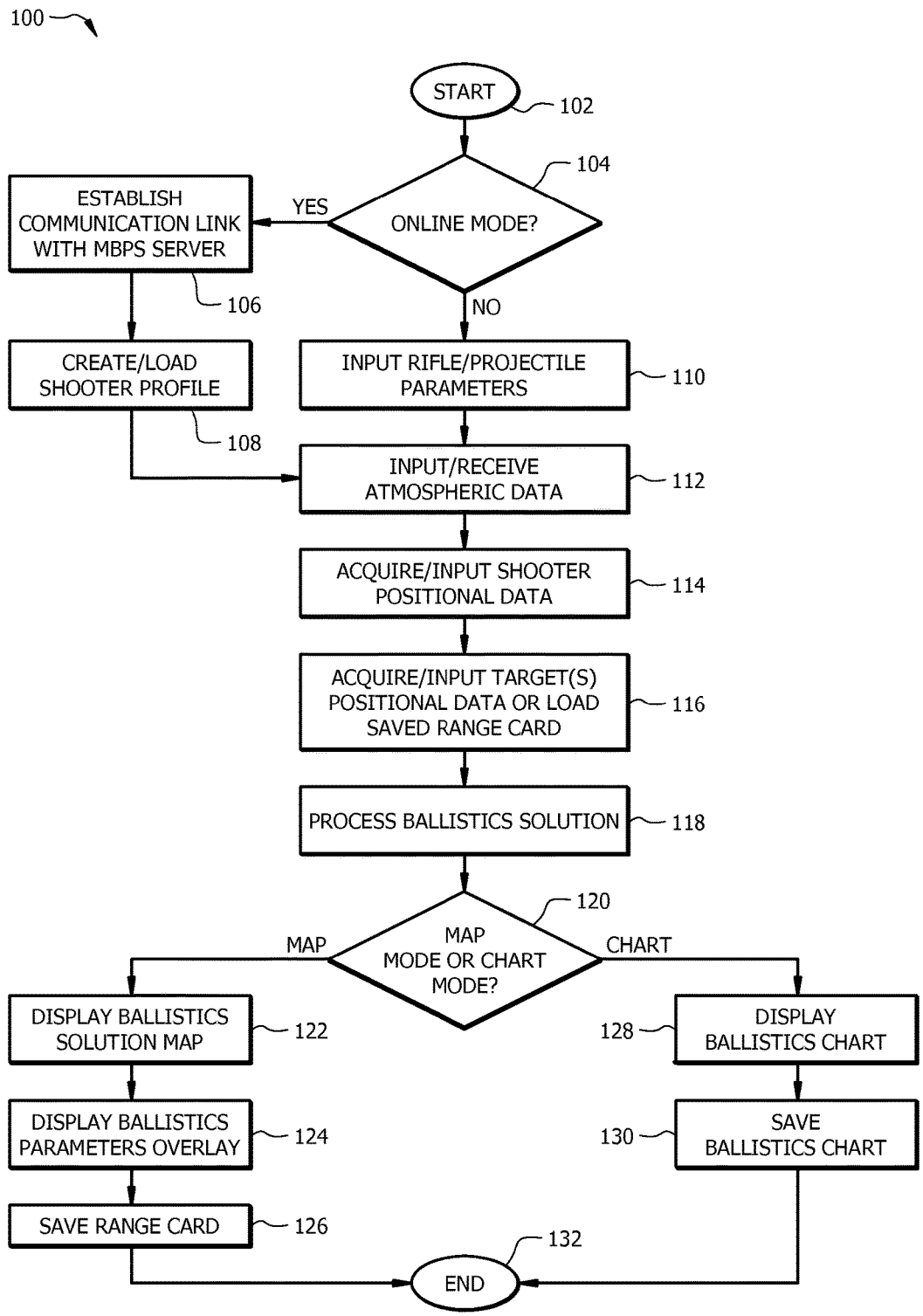
FIG. 1 is a process flow diagram illustrating steps performed by an embodiment of the mobile ballistics processing and display system.

Where used in the various figures of the drawings, the same reference numerals designate the same or similar parts. All figures are drawn for ease of explanation of the basic teachings of the invention only; the extensions of the figures with respect to number, position, relationship, and dimensions of the parts to form the preferred embodiment will either be explained or will be within the skill of persons of ordinary skill in the art after the following teachings of the present invention have been read and understood.

DETAILED DESCRIPTION OF THE DRAWINGS

Several exemplary embodiments of the claimed invention(s) will now be described with reference to the drawings. Unless otherwise noted, like elements will be identified by identical numbers throughout all figures. The invention(s) illustratively disclosed herein suitably may be practiced in the absence of any element that is not specifically disclosed herein.

Systems and methods for processing and displaying ballistics solutions via a computing device are disclosed herein. It should be noted that while the exemplary embodiments described herein are associated with bullet trajectories, the systems and methods taught below could also be equally utilized in connection with other types of projectiles, regardless of the source of the force that propels such projectiles into motion or sustain them in flight.

Referring now to FIG. 1, a process flow diagram 100 illustrating steps performed by an embodiment of the mobile ballistics processing and display system (hereinafter, "MBPDS"), the MBPDS provides one or more users with a mobile computing device for calculating ballistics solutions for one or more targets based on a plurality of ballistics variables, displays real-time geographic information to users, and further displays representations of approximate in-flight bullet characteristics in conjunction with said geographic information. It should be noted at the outset that the steps appearing in the process flow diagram shown in FIG. 1 are but one example of the ordering of steps that may be taken by a user and/or by the MBPDS to provide the ballistics processing and display claimed herein. The ordering of steps shown in FIG. 1 is not essential to the invention and may be altered in the preferred embodiments shown or other alternate embodiments of the MBPDS, without altering the underlying concepts taught herein.

In one embodiment of the MBPDS, a user will interface with the system via a graphical user interface (GUI) and, as further discussed in greater detail below, the user will be provided with an option 104 to utilize the MBPDS in an online mode by establishing a communications link via a communications network, or alternatively have the option to utilize the system in an offline mode.

If the user chooses to utilize the MBPDS in an online mode, the MBPDS computing device executing a software application will attempt to establish 106 a communications link with a MBPDS server. If a communications link is successfully established, the user will be prompted to create a MBPDS account or, if such an account has previously been established by the user, the user will be prompted to provide authenticating information such as a login name and password so that the MBPDS server can verify the identity of the particular user. If the user is successfully authenticated by the MBPDS server, the user will be given the option to download one or more previously created shooter profile(s) into the MBPDS computing device. In one embodiment of the MBPDS, and as described in further detail below, a shooter profile may comprise information relating to all or part of the ballistics variables needed for accurate ballistics solution processing. Such ballistics variables that may comprise a profile may include bullet parameters and rifle setup information as described further below.

Still referring to FIG. 1, if a user chooses to utilize the MBPDS in offline mode, the user will be provided with a menu icon (or prompted) to manually input 110 information relating to ballistics variables needed for ballistics solution processing. A user operating the MBPDS computing device in offline mode will still be given the option to manually input ballistics variables such as bullet parameters and rifle setup information.

In one embodiment, the MBPDS will store in a database (alternatively referred to herein as a "bullet library") information relating a plurality of different cartridges/bullets of various calibers, bullet weights, and bullet types. As an alternative to manually inputting bullet ballistics information into the MBPDS, users will preferably be provided an option to search for particular cartridges/bullets that the user plans to shoot during a range session. If a desired cartridge/bullet that is being shot by the user is found within the bullet library database, the information relating to ballistics variables for that bullet that is stored within the library database may be loaded for use in ballistics solution processing by the MBPDS. The user will be further prompted to input additional information relating to other ballistics variables (information relating to rifle setup and optionally, information relating to spin drift and line of sight angle,) as described in further detail below.

The MBPDS will be further configured to receive atmospheric information 112 for further use in more accurately predicting bullet trajectories. One or more atmospheric sensors such as, for example, a wind speed/direction sensor, a temperature sensor, a pressure sensor, and a relative humidity sensor, will be preferably connected to or otherwise integrated into the MBPDS computing device so as to provide real-time atmospheric data to the system for use in ballistics solution processing. The MBPDS will further be configured to optionally receive atmospheric data from a weather server, for use in ballistics solution processing. The MBPDS will even further be configured to provide for the manual input of atmospheric data by a user.

Next, geographical information relating to positional data associated with the user and one or more targets is acquired from remote positional data sources or manually inputted by the user 114. In either online or offline mode, a GPS transceiver in communication with the MBPDS will acquire positional data (for example, map coordinates and elevation) associated with the location of the MBPDS computing device from one or more GPS satellites or other navigational aids (for example, LORAN, Wi-Fi network, etc.). When the MBPDS is operated in online mode, the MBPDS will transmit, via a communications network, such positional data associated with the MBPDS computing device to a geographic information systems server, and from such server, receive map data associated with the device location to display on the MBPDS computing device. At a predetermined frequency of time, the MBPDS is configured to request and receive updated map data from the geographic information systems server, and utilize such map data to refresh the map display. When the MBPDS is operated in offline mode, map data stored in the MBPDS computing device or connected storage device, will be accessible for use and displayable to the user.

The MBPDS user will be provided with the ability to manually identify his or her shooting position on the map. An input device such as a touchscreen interface integrated into the MBPDS display, will provide the user with the ability to identify his or her location on the map display using a finger or pointing device. Coordinate data associated with the map pinpoint indicated by the user on the map display will be utilized in calculating one or more ballistics solutions. Alternatively, the MBPDS system will be configured to automatically approximate the shooter's position using GPS positional data, and to represent such approximate position on the map display.

Next, the user will be provided with the ability to manually or automatically identify the location(s) of one or more targets 116. An input device such as a touchscreen interface integrated into the MBPDS display, will provide the user with the ability to identify the location of one or more targets on the map display using a finger or pointing device. Alternatively, the MBPDS system is configured to automatically approximate the location of one or more targets using GPS positional data, and to represent such approximate position on the map display. In one embodiment, the user will transport the MBPDS computing device to the target(s) location(s) before automatically acquiring positional data associated with a particular target.

In alternate embodiments, the MBPDS will be configured to automatically approximate the position of one or more targets by utilizing data acquired from other connected electronic input devices such as, for example, a laser range finder and a compass. Such input devices may be integrated into the MBPDS computing device or be configured to communicate data to the computing device (for example, via Bluetooth transmission). From such range and directional information, those of skill in the art will realize that it will be possible for the MBPDS computing device to calculate approximate positional locations of distant targets without the need to physically move to such locations. In further alternate embodiments, the MBPDS will be configured to store one or more "range cards" containing prepopulated positional data associated with one or more shooter locations and/or one or more target locations. In such alternate embodiments, the user will be provided with the ability to load such range cards for continued use. If a range card is loaded for use, shooter location(s) and target location(s) will be displayed on the display map accessible to the user on the MBPDS computing device.

Still referring to FIG. 1, the MBPDS in this embodiment is configured to process 118 one or more ballistics solutions with respect to the user/shooter location and each of the one or more targets selected. More specifically, a central processor unit of the MBPDS is configured to process data associated with one or more ballistics variables associated with a projectile to generate data associated with projected in-flight characteristics corresponding to said projectile. In processing one or more ballistics solutions, the MBPDS is configured to calculate the trajectory of the bullet used by the user/shooter by taking into account the effect of the ballistics variables associated with the projectile (in this embodiment, a bullet) inputted or otherwise acquired/loaded by the user, as well as the positional data associated with the shooter and target as inputted by the user or as otherwise acquired/loaded by the MBPDS. The MBPDS will also preferably process one or more ballistics solutions by taking into account atmospheric data such as wind speed/direction, temperature, relative humidity, atmospheric pressure, and other ballistics variables such as elevation/altitude. The processing of ballistics solutions will, in one embodiment, will take place locally in one or more processors found in the MBPDS computing device using known methods for making such calculations. In alternate embodiments, ballistics solution processing may occur remotely at a MBPDS server or other third party server upon the establishment of a communications link to transmit and receive information relating to ballistics variable and ballistics solutions.

In one embodiment of the MBPDS, the user will be provided with an option to view the pertinent results of such ballistics solution processing in either a "map mode" or a "chart mode." In map mode 122, the MBPDS will display, among other items, a ballistics solution map showing the position of the shooter, the position of the one or more targets, the distance between the shooter and target(s), and elevation/windage adjustments (with respect to the "zero" orientation) needed to be made by the shooter to hit the target(s). The MBPDS will also be configured to provide graphical representations of approximate in-flight bullet characteristics in an overlay 124 on the map display, thereby providing the user/shooter with an easily and quickly understandable depiction of where in the bullet's projected path, the bullet's characteristics change with respect to predetermined criteria/variables set by the user as discussed in further detail below with reference to FIG. 9 and FIG. 10. In one embodiment, the MBPDS will provide the user with the ability to save 126 data associated with a map presentation ("range card") on the MBPDS (or remotely store such data) for future use by himself or herself, or by other third parties. In alternate embodiments of the MBPDS, two or more MBPDS users will be capable of communicating ballistics data, map data, and other data to each other over a network ("squad mode").

In "chart mode" of the MBPDS, the MBPDS computing device is configured to display ballistics data in the form of a ballistics table. As described in further detail below with reference to FIG. 11, bullet trajectory information, bullet characteristics information (velocity, energy, maximum vital range, maximum point blank range, etc.), and required shooter adjustments (elevation/windage) are displayed to a user on a ballistics table in distance increments between the shooter and the target(s).

Figure 2:
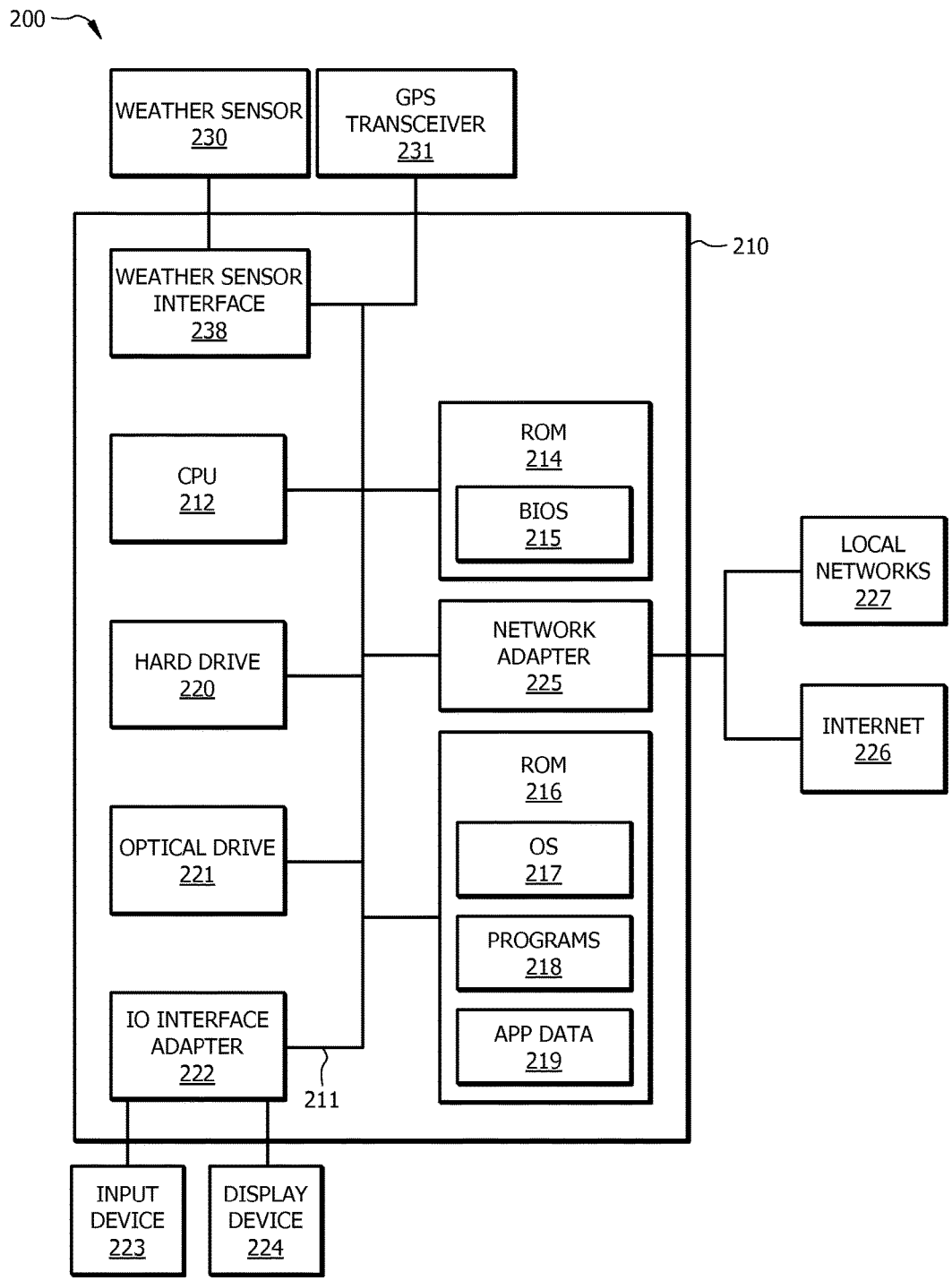
FIG. 2 is a block diagram of an embodiment of a mobile computing device (for on which exemplary processes of an embodiment of the mobile ballistics processing and display system can be executed.

Referring now to FIG. 2, a preferred exemplary block diagram 200 of a computing device 210 on which exemplary processes of the MBPDS can be executed according to one embodiment of the invention. It should be noted that while the preferred embodiment of the MBPDS computing device is a smart phone or tablet device, other types of computing devices such as, for example, laptops and wearable computers (for example, a smart watch) may also be utilized as MBPDS computing devices. In one embodiment, the computing device includes a central processor unit (CPU) 212, read only memory (ROM) 214, random access memory (RAM) 216, and a system bus 211 that couples various system components including the RAM 216 to the processor unit 212. The system bus 211 may be any of several types of bus structures including a memory bus or memory controller, a peripheral bus and a local bus using any of a variety of bus architectures. A basic input/output system 215 (BIOS) is stored in ROM 214. The BIOS 215 contains basic routines that help transfer information between elements within the computing device 210.

The computing device 210 can further include a disk drive 220 for reading from and writing to a hard disk (solid state or platter), an optical disk drive 221 for reading from or writing to a removable optical disk such as a CD ROM, DVD, or other type of optical media. The hard disk drive 220 and optical disk drive 221 can be connected to the system bus 211 by a hard disk drive interface (not shown), flash drive (not shown), and an optical drive interface (not shown), respectively. The drives and their associated computer-readable media provide nonvolatile storage of computer readable instructions, data structures, programs, and other data for the computing device 200.

Although the example environment described herein employs a hard disk drive 220, other types of computer-readable media capable of storing data can be used in the example system. Non-limiting examples of these other types of computer-readable mediums that can be used in the example operating environment include flash memory cards. A number of program modules may be stored on the ROM (214), RAM (216), hard disk drive 220 or optical disk drive 221, including an operating system 217, one or more application programs 218, other program modules, and program (e.g., application) data 219.

A user may enter commands and information into the computing device 210 through input devices 223, such as a keyboard, capacitive touch screen, and/or mouse (or other pointing device). Examples of other input devices 223 may include a microphone, camera, compass, and laser rangefinder. These and other input devices are often communicatively connected to the processing unit 212 through an I/O port interface 222 that is coupled to the system bus 211. Such input devices may be integrated into the computing device or alternatively, communicate with the computing device by known data transfer methods (for example, Bluetooth, infrared light signals, etc.). A screen 224 or other type of display device is also communicatively connected to the central processor unit via the system bus 211 via an interface, such as the IO interface 222. In addition to the display device 224, computing systems typically include other peripheral output devices (not shown), such as speakers and document printers. In one embodiment, the MBPDS computing device 210 may be configured to be in communication with a weather sensor 230 for providing local weather information to the MBPDS for use in processing ballistics solutions. In one embodiment, a GPS transceiver 231 is configured for connection to the MBPDS computing device, said transceiver to process positional information received one or more GPS satellites or other navigational devices.

The computing device 210 may operate in a networked environment using logical connections to one or more remote computing devices (for example, in "squad mode"). The remote computing device may be another MBPDS computing device, smart phone, tablet computer, personal computer, a server, a router, a network PC, a peer device or other common network node, and typically includes many or all of the elements described above relative to the computing device 210. In certain embodiments, the network connections can include a cellular network, Bluetooth, local area network (LAN) or a wide area network (WAN). Such networking environments are commonplace in offices, enterprise-wide computer networks, intranets, and the internet 226.

When used in a WAN networking environment, the computing device 210 typically includes a modem, Ethernet card, or other such means for establishing communications over the wide area network, such as the Internet 226. The modem or other networking components, which may be internal or external, can be connected to the system bus 211 via a network interface or adapter 225. Network adapter 225 may be one or more networking devices that enable computing devices associated with the MBPDS to transmit data in a network with an entity that is external to the server, through any communications protocol supported by the server and the external entity. Network adapter 225 may include, but is not limited to, one or more of a network adaptor card, wireless network interface card, router, access point, wireless router, switch, multilayer switch, protocol converter, gateway, bridge, bridge router, hub, digital media receiver, and/or repeater.

Figure 3:
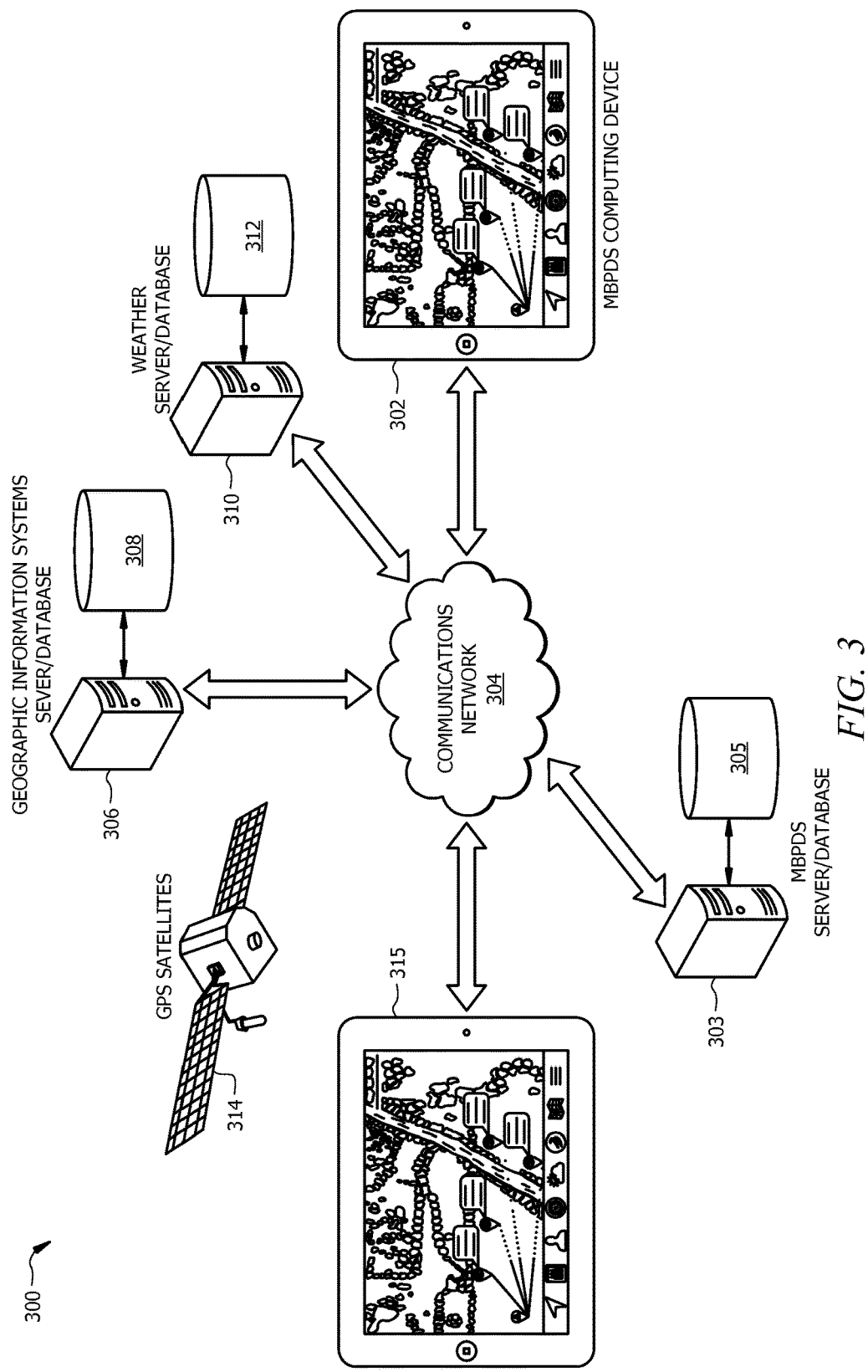
FIG. 3 is a network diagram showing an embodiment of a mobile ballistics processing and display system and other devices with which it is in communication according to one embodiment of the invention.

Referring now to FIG. 3, a network diagram 300 showing MBPDS computing device 302 and other devices with which it is in communication according to one embodiment of the invention. The MBPDS computing device 302 is preferably in communication with other networked devices over a cellular network 304 or WAN such as the Internet. A MBPDS server and associated database communicates with the MBPDS computing device, the MBPDS server providing the user with authentication to use the system, previously saved data associated with bullet and rifle setups preferred by the user, and remote processing of ballistics solutions. In alternate embodiments of the MBPDS, ballistics processing is performed using a processor of the MBPDS computing device. GPS satellites 314 receive and transmit positional data to/from the MBPDS computing device via a GPS transceiver connected to the device. A geographic information systems server 306 in communication with the MBPDS computing device (or alternatively, with the MBPDS server, which relays communications to/from the MBPDS computing device), via a communications network, receives coordinate data from the MBPDS server regarding the location of the device, and returns map data associated with such location for display on the MBPDS computing device.

A weather server 310 and associated database 312 is also capable of communicating with the MBPDS computing device (or alternatively, with the MBPDS server, which relays communications to/from the MBPDS computing device), providing atmospheric data used by the MBPDS computing device to in processing ballistics solutions. In alternate embodiments of the MBPDS, the MBPDS computing device will be configured to establish a communications link with one or more other MBPDS computing devices 315, allowing users to communicate positional data and ballistics information amongst one another ("squad mode"). Such communications capabilities between MBPDS computing devices will ideally allow for greater coordination amongst shooters, and for increased range safety as each shooter will know the position of other shooters on the range.

Figure 4:
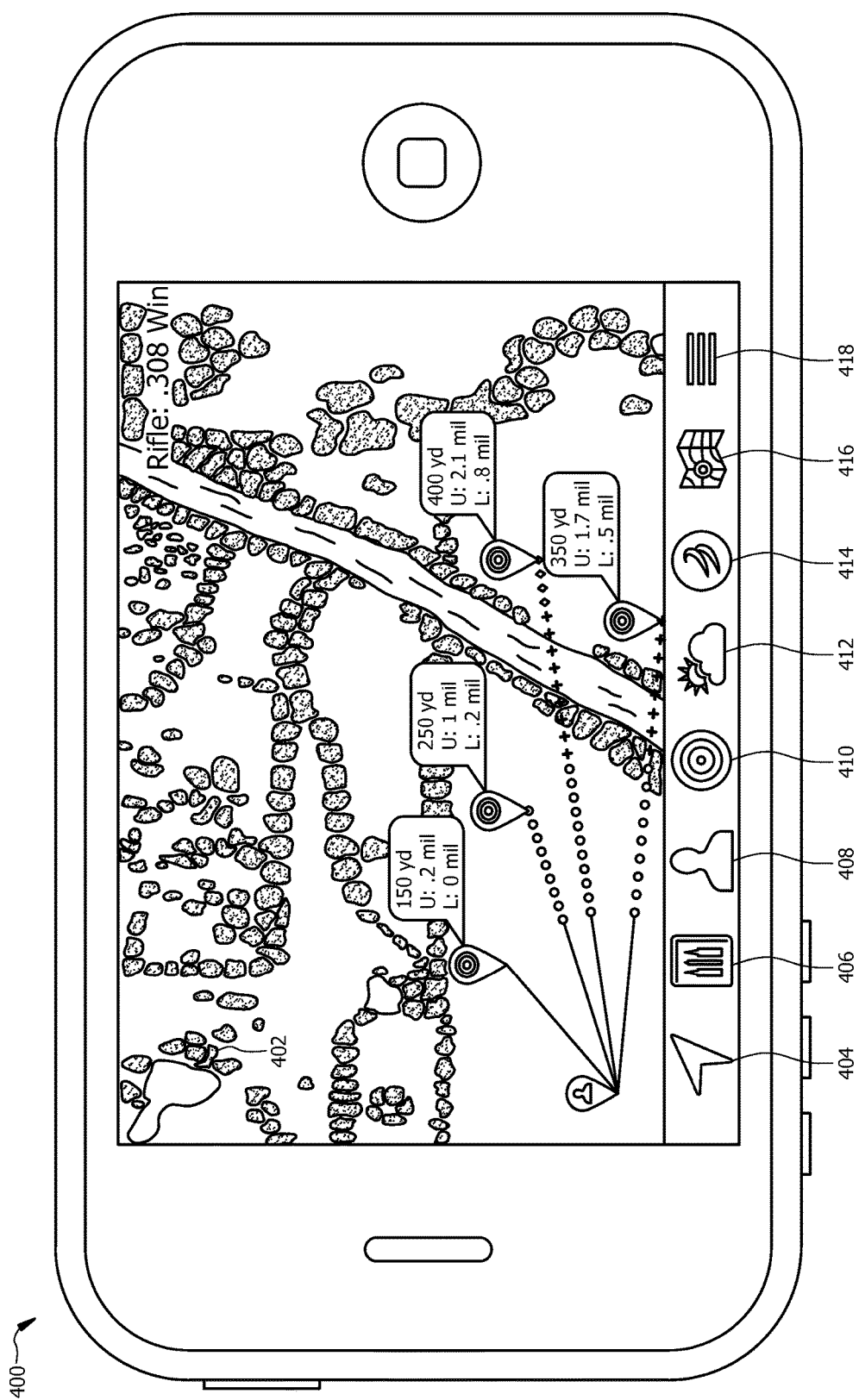
FIG. 4 illustrates a screenshot of a display of an embodiment of the mobile ballistics processing and display system, said display showing geographic information, ballistics solutions, representations of approximate in-flight bullet characteristics, and menu options available to a user.

Referring now to FIG. 4, a screenshot 400 of a display 402 of an embodiment of the MBPDS computing device, said display showing geographic information (map features) relating to the locations of the shooter, targets, terrain features, as well as ballistics solutions (distance to target, elevation/windage adjustments), representations of approximate in-flight bullet characteristics (bullet velocity, bullet energy, maximum vital range), and menu icons available to a user. In one embodiment, the GUI of the MBPDS provides users with seven main menu icons, as well as an icon that may be selected to view additional "extended" menu icons. In one embodiment, the MBPDS will be configured to include a touchscreen, allowing a user to select a menu icon with a finger or other pointing device. Different screens will appear on the GUI, depending on the menu icon selected by a user. The types of main menu icons shown in FIG. 4 are solely illustrative of examples of menu items that may be provided to a user to allow them to more easily navigate the available features of the MBPDS. In alternate embodiments of the MBPDS, menu icons may vary by type and number. As discussed in further detail with reference to FIG. 5 below, the main menu icons displayed and available for selection by a user include a location icon 404, armory icon 406, shooter icon 408, target icon 410, weather icon 412, weather hardware icon 414, map icon 416, and an extended menu icon 418.

Figure 5:
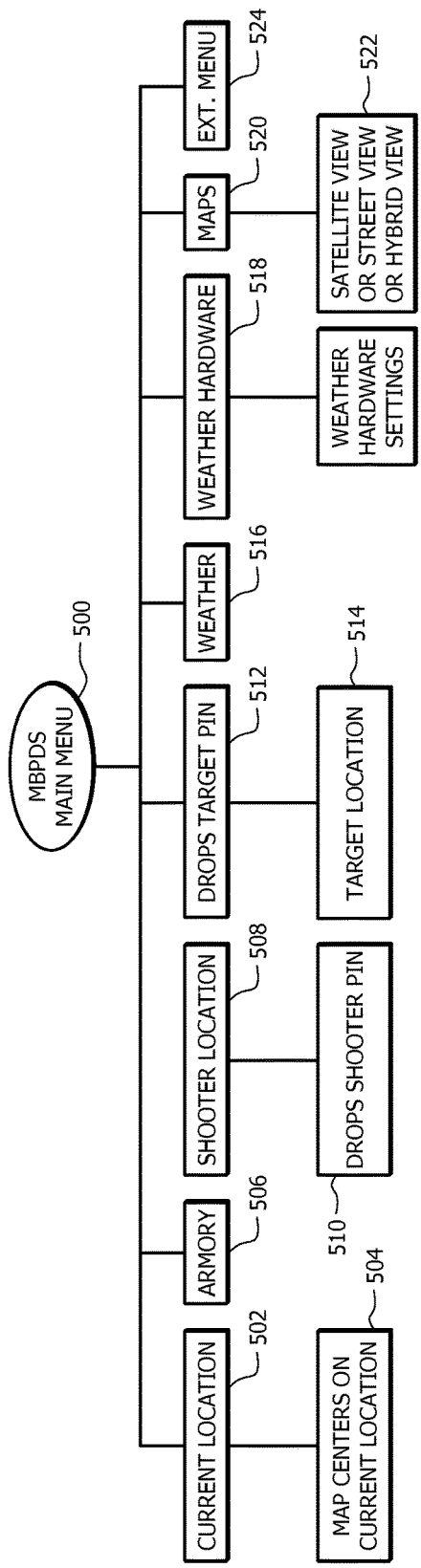
FIG. 5 shows a block diagram representing a main menu map of a software application executed by an embodiment of the mobile ballistics processing and display system.

Referring now to FIG. 5, a block diagram representing a main menu 500 map of a software application executed by an embodiment of the MBPDS. As previously described above with respect to FIG. 4, in one embodiment of the MBPDS, a plurality of menu icons are displayed to a user, thus providing an intuitive means for navigating the software features of the MBPDS. The main menu icons displayed and available for selection by a user include a current location icon 502, armory icon 506, shooter icon 508, target icon 512, weather icon 516, weather hardware icon 518, map icon 520, and an extended menu icon 528. When a main menu icon is selected by a user, the MBPDS will execute an operation without any further prompting of the user and/or will advance to a sub-menu screen and provide additional prompts to the user.

Figure 6:
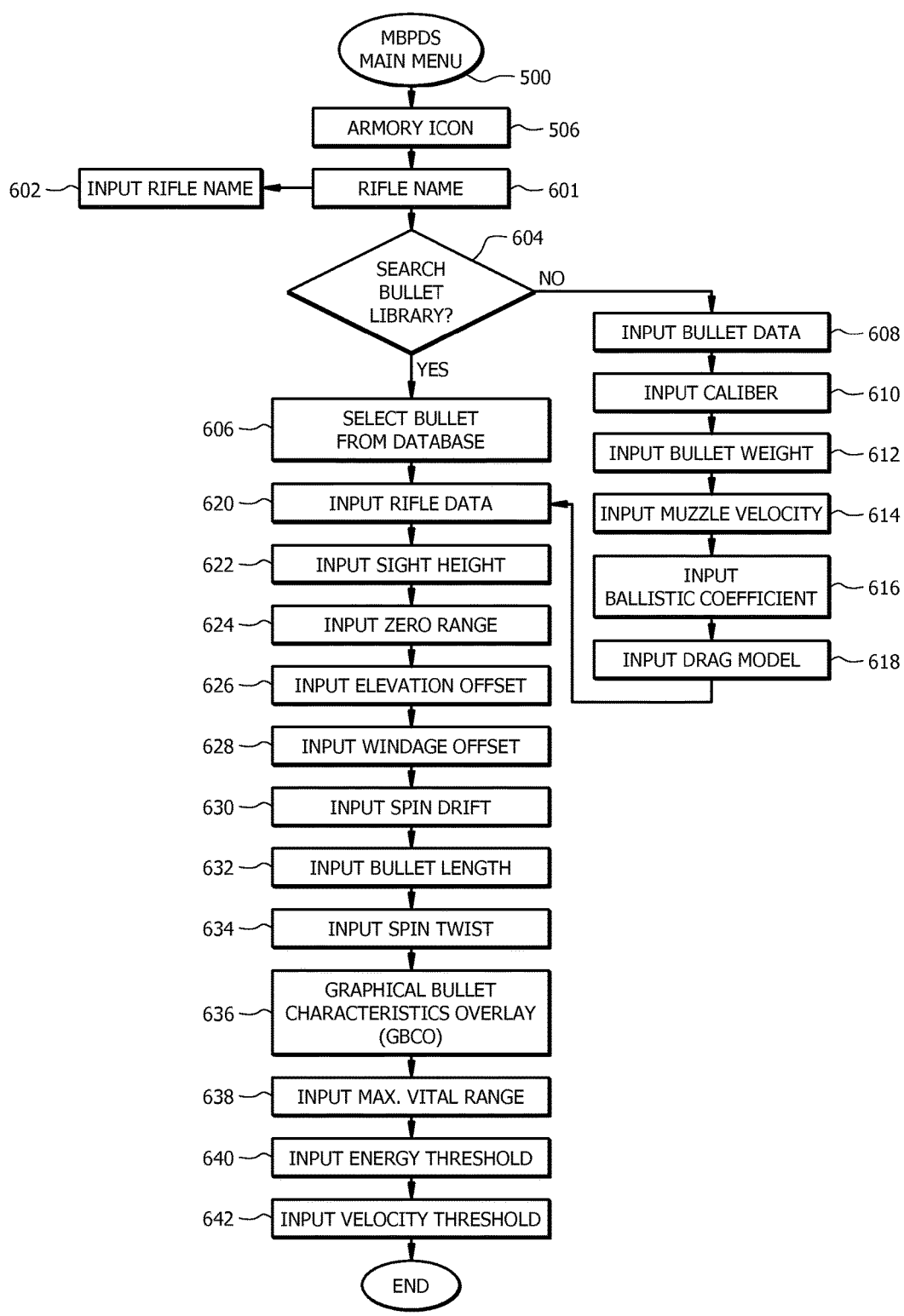
FIG. 6 shows a process flow diagram associated with the "Armory" icon included in a software application executed by an embodiment of the mobile ballistics processing and display system.

Still referring to FIG. 5, with respect to the current location menu icon 502, selection of the icon will cause the MBPDS map display to center at the then current location of the MBPDS computing device. As described above, this operation will require the MBPDS to acquire positional data from one or more GPS satellites, transmit such positional data to a geographic information systems server, and receive and display map data from such server (map data may also accessed from cache). The armory icon 506, described in further detail with reference to FIG. 6, provides the user with additional sub-menus which can be navigated to input or otherwise acquire ballistics data (bullet attributes, rifle setup, spin drift, etc.) and to further input criteria for in-flight bullet/projectile characteristics (maximum vital range, energy threshold, and velocity threshold).

With respect to the shooter icon 508, selection of this icon by a user will cause a graphical pin to be displayed at the current location of the MBPDS computing device. With respect to the target icon 512, selection of this icon by a user will cause a graphical pin to be displayed at the current location of the MBPDS computing device. The MBPDS will be configure to allow the user, using a touchscreen input device integrated into the MBPDS computing device, to manually identify the location of the shooter and/or one or more targets. Manual input of the geographical location of shooter and target(s) may provide for more accurate positional information in some cases, especially in situations where it is difficult to obtain accurate reception from GPS satellites.

Figure 7:
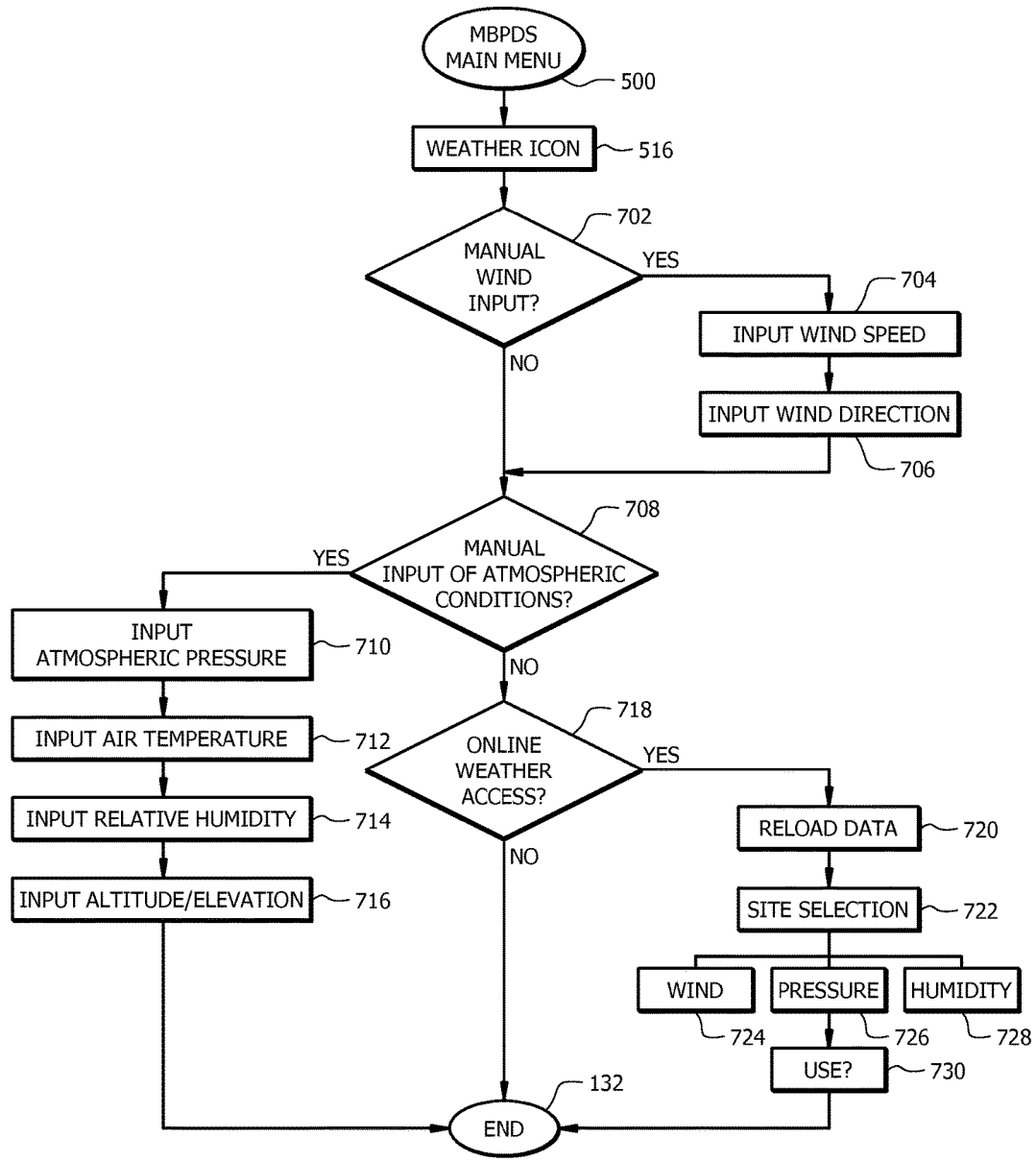
FIG. 7 shows a process flow diagram associated with the "Weather" icon included in a software application executed by an embodiment of the mobile ballistics processing and display system.

The weather icon 516, described in further detail with reference to FIG. 7, provides the user with additional sub-menus which can be navigated to manually input various weather attributes (wind speed/direction, temperature, atmospheric pressure, humidity, and altitude). Further sub-menus of the weather icon are provided for accessing weather attributes from online sources such as, for example, the weather server discussed with reference to FIG. 3. A weather hardware icon 518 is further provided to acquire weather attributes from an atmospheric sensor that is integrated or otherwise connected to the MBPDS computing device via a wired or wireless connected. The atmospheric sensor (also referred to herein as a "weather sensor") is configured to collect information relating to one or more weather attributes at the location of the MBPDS computing device, and to transmit such weather information to the MBPDS for use in processing ballistics solutions. In alternate embodiments, the MBPDS may communicate wirelessly with one or more local atmospheric sensors positioned, for example, at the shooting range where the user is located, and utilize atmospheric data collected by such sensor(s) for ballistics processing.

In one embodiment, the MBPDS computing device may be configured to communication with a WeatherFlow® wind meter by utilizing a WeatherFlow® API (provided by WeatherFlow, Inc.) to utilize wind speed/direction data from the wind meter for processing ballistics solutions. In other alternate embodiments, the MBPDS may be configured to communicate and use atmospheric data from other types of atmospheric sensors capable of collecting various types of atmospheric data that may be useful in processing ballistics solutions. One advantage of utilizing an atmospheric/weather sensor in connection with the MBPDS computing device is that the weather information acquired by the sensor is likely to be more accurate than weather data acquired from online sources of weather data. In one embodiment, a wind meter utilized by the MBPDS will be configured to collect wind speed/direction data for a thirty second time period (a "sample"), and calculate average wind speed and wind direction values. Users will be capable of modifying sample collection time, view past saved sample data, and add text descriptions of samples. Further an average wind speed and wind direction value associated with a sample may be deleted, saved, and/or submitted to the MBPDS for further use in ballistics processing. Users of the MBPDS will be provided with an option to manually start and stop collection of weather data.

Figure 8:
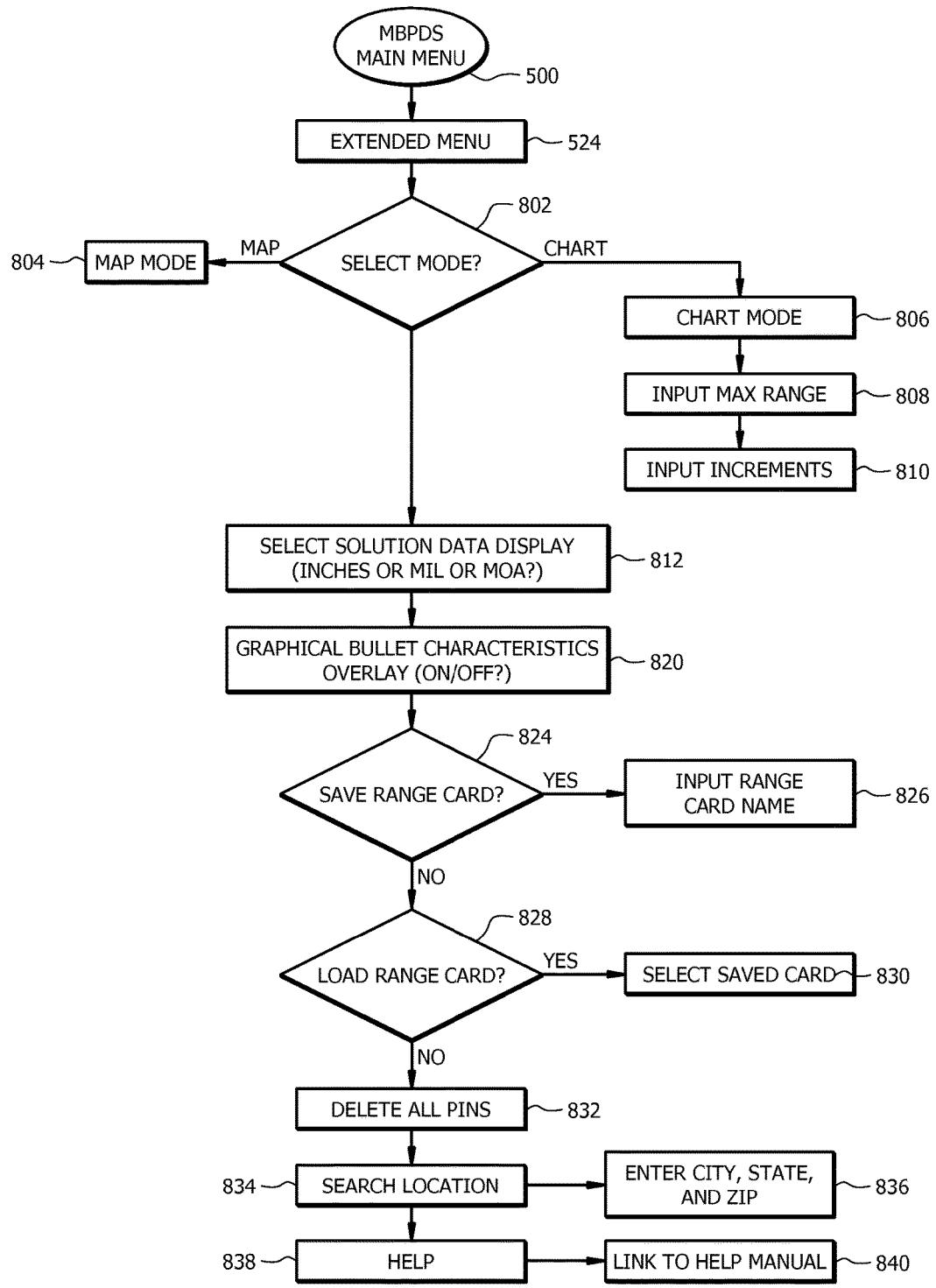
FIG. 8 shows a block diagram menu map associated with the "Extended Menu" icon included in a software application executed by an embodiment of the mobile ballistics processing and display system.

A map icon 520 is displayed to users and allows for the selection of one or more map views. For example, a user may select to view a "satellite view" 522 of the map, which provides what appears to be an overhead aerial view of the terrain surrounding the computing device. Another map viewing option is a "streets view" 522, which displays an overhead view of graphical representations of streets and other roadways surrounding the computing device. Another map viewing option is a "satellite and streets view" 522, which displays a combination of an overhead aerial view that is overlaid with graphical representations of street and other roadways surround the computing device. In one embodiment, map data for display on the MBPDS may be obtained over a communications network from a commercial source for map information such as, for example, Google Maps® provided by Google, Inc. An extended menu icon 524, described in further detail below with reference to FIG. 8, provides users access to various additional submenus that allow for modifications to be made to settings and to perform other operations provided by the MBPDS.

Referring now to FIG. 6, a process flow diagram associated with the "Armory" icon 506 included in a software application executed by an embodiment of the MBPDS. Under the armory icon, users are provided with a process for inputting various information affecting the processing of ballistics solutions. A "Rifle Name" step 601 is provided, providing users with the ability to input 602 a rifle "name" or "profile," which will contain the ballistics information associated with a particular rifle/bullet combination. Users will be provided with a "Search Bullet Library" step 604 that will enable them to search a ballistics database (stored locally or remotely) for ballistics data associated with a particular cartridge and bullet. If a desired cartridge/bullet is found, the user may select 606 it for use by the MBPDS in ballistics processing (rather than manually inputting such ballistics information). Alternatively, users may skip this step 606 and proceed to the "Input Bullet Data" step 608, which prompts users to manually input information relating to the particular cartridge/bullet that he or she will be using. In one embodiment, users will be prompted to manually input the bullet caliber 610, bullet weight 612, bullet muzzle velocity 614, bullet ballistic coefficient 616, and the bullet drag model 618.

Still referring to FIG. 6, users of the MBPDS are next provided with an "Input Rifle Data" step 620, which prompts them to manually input rifle setup information that is used in processing ballistics solutions. In one embodiment, users are prompted to manually input information relating to sight height (distance between axis of bore and axis of optical sight) 622, zero range (range at which rifle was zeroed) 624, elevation offset (elevation distance by which optical sight if off zero) 626, and windage offset (windage distance by which optical sight if off zero) 628. In one embodiment of the MBPDS, the input (either manually or from a database such as the bullet library) of load data and rifle data is required before the processing of a ballistics solution by the MBPDS. In one embodiment, users are provided with the option to input spin drift 630 information for further accuracy in ballistics processing. If users choose to enter spin drift information, they are prompted to manually input bullet length 632 and spin twist 634.

In one embodiment of the MBPDS, users are provided with the option to display graphical representations of in-flight bullet characteristics, which provide users with an easily understandable illustration of how a particular bullet's in-flight characteristics will change along a projected path from the shooter to a target. As explained in further detail below with reference to FIG. 9 and FIG. 10, the graphical representation of in-flight bullet characteristics may be illustrated, in one embodiment, by an overlay over the map display, allowing a user to understand projected in-flight characteristics in the context of the actual shooting environment. A GBCO ("Graphical Bullet Characteristics Overlay") step 636 is provided, allowing a user to provide in-flight bullet/projectile characteristic criteria to be used in generating the graphic representations of the in-flight bullet characteristics. In one embodiment, a user may a desired maximum vital range value ("MVR") 638, which is the maximum distance at which a bullet will strike a particular vital area (length in units chosen by user) without the need for making elevation adjustments. Another in-flight bullet characteristic criteria that users may manually input is the energy threshold ("Et") 640, which is the minimum energy (ft/lbs) that a shooter would desire to deliver to a target. Another in-flight bullet characteristic criteria that users may manually input is the velocity threshold ("Vt") 642, which is the minimum velocity (ft/s) that a shooter would desire to deliver to a target. It should be noted that in alternate embodiments of the MBPDS, any in-flight bullet characteristic or criteria may be utilized in displaying the types of graphical representations claimed herein.

In alternate embodiments of the MBPDS, the MBPDS may be configured to automatically calculate line of sight angle. For example, in such alternate embodiments of the MBPDS, a line of sight angle could be calculated for an uphill or downhill shot if the distance to target were ascertained (via laser rangefinder, mil-dot optic, map data, or human estimate), and the elevation of the shooter and target were ascertained (via map data or GPS data).

Referring now to FIG. 7, a process flow diagram associated the "Weather" icon 516 included in a software application executed by an embodiment of the MBPDS. User are initially provided with the option to manually input information associated with one or more local weather attributes for use in processing ballistics solutions. More specifically, users may manually input wind data and even more specifically, the wind speed 704 and the wind direction 706. In alternate embodiments of the MBPDS, users will be permitted to input differing wind data at one or more points or sections of a bullet's projected path.

Still referring to FIG. 7, users next have the option of manually inputting other information relating to atmospheric 708 conditions such as atmospheric pressure 710, air temperature 712, relative humidity 714, and altitude 716. In one embodiment, users are further provided with the option to acquire atmospheric data from an online 718 source for such data (for example, the weather server described with reference to FIG. 3). As it is important for the processing of ballistics solutions that weather data not be stale, users are prompted to reload 720 weather data prior to initiating ballistics processing. In one embodiment of the MBPDS, users will be provided with the ability to choose 722 from one or more commercially or privately available online sources of weather data. Atmospheric/weather data that may be acquired from an online source may include, but is not limited to, data associated with wind speed/direction 724, atmospheric pressure 726, and relative humidity 728. The user will be provided with the weather/atmospheric data from the online source and, if the data appears to accurately reflect the actual local weather conditions, the user will be prompted to select the data for use 730.

Referring now to FIG. 8, a block diagram menu map associated with the "Extended Menu" icon 524 included in a software application executed by an embodiment of the MBPDS. The "Extended Menu" icon 524 may be selected by a user from the main menu 500, allowing the user to access various sub-menus of the software. A "Mode" sub-menu is provided to users, allowing a user to choose the manner in which he or she wants the results of ballistics processing to be displayed. The user may select a "Map" icon 804 to display ballistics solution information on a map as further described below with reference to FIG. 9. Alternatively, the user may select a "Chart" icon 806 to display ballistics solution information in chart/table format as further described below with reference to FIG. 11. In chart mode, the user will be permitted to select the maximum range 808 and distance increments 810 to be display in the ballistics chart/table.

A "Solution Data Display" icon 812 is further provided to users, allowing them to set the type of units that the MBPDS will display in connection with calculated ballistics solutions. In one embodiment, users may select range and holdover units of inches or centimeters, milliradians ("Mil"), or minutes of angle ("MOA"). A "GBCO" icon 820 ("Graphical Ballistics Characteristics Overlay") is further provided to users, allowing users to activate or deactivate (on/off) the GBCO in map mode. A "Save Range Card" icon is provided to users, allowing a previously created range card (map and ballistics data) to be named and saved 830. A "Load Range Card" icon is further provided to users, allowing a user to access a previously saved range card to be selected 830 and loaded for further use by the MBPDS. A "Delete All Pins" icon 832 is provided, allowing a user to delete all pins displayed on a map when the MBPDS is in map mode. A "Search Location" icon 834 is provided, allowing a user to input geographic information (city, state, zip, etc.) 836 to access maps at the specified location. A "Help" icon 838 is further provided, providing users with a link 840 to an online help manual associated with the MBPDS.

Figure 9:
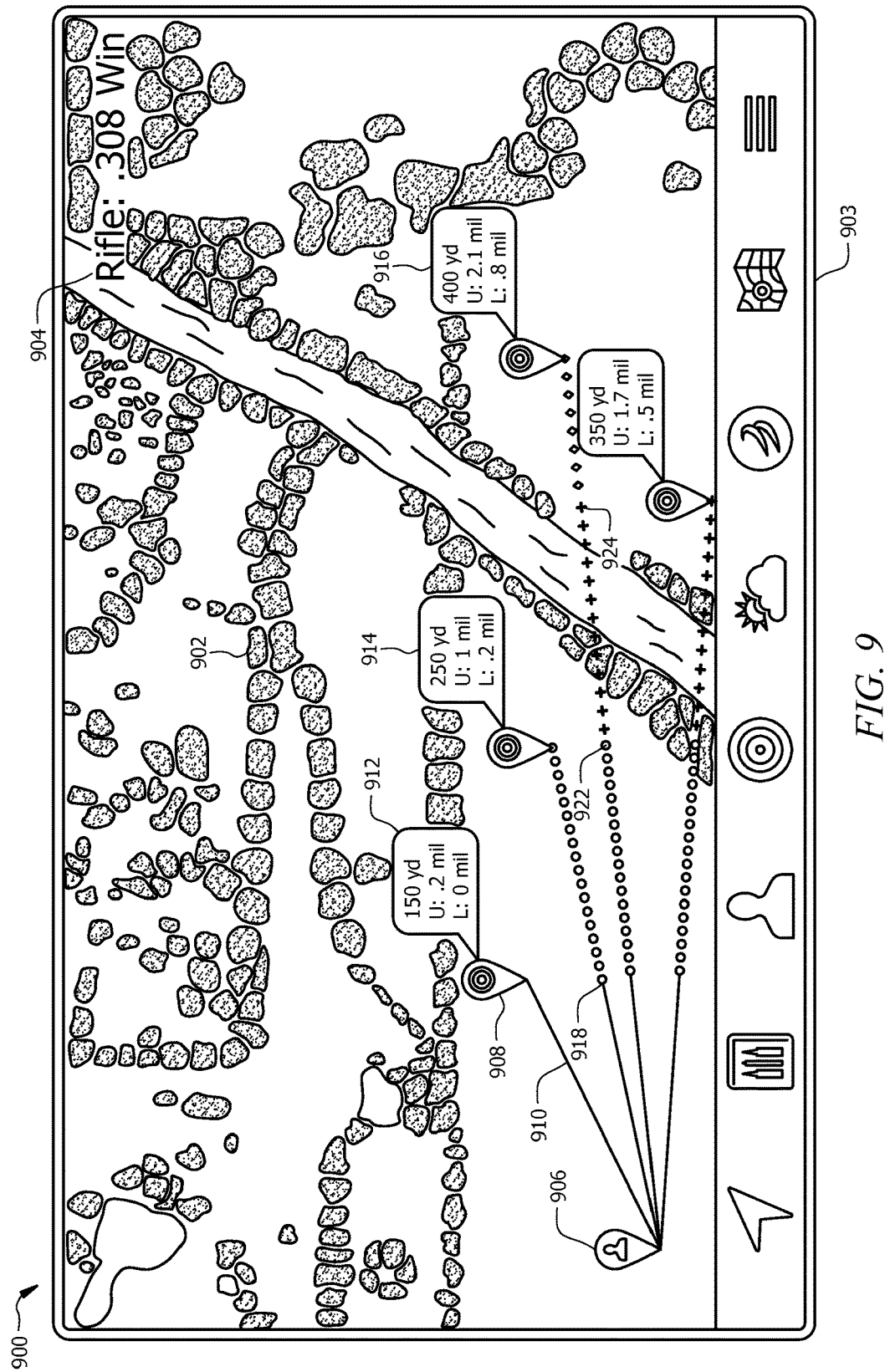
FIG. 9 further illustrates a screenshot of a display of an embodiment of the mobile ballistics processing and display system, said display showing geographic information, ballistics solutions, representations of approximate in-flight bullet characteristics, and menu options available to a user as shown at FIG. 4.

Referring now to FIG. 9, a screenshot 900 of a display of an embodiment of the MBPDS, said display showing geographic information, ballistics solutions, representations of approximate in-flight bullet characteristics (GBCO), and menu options available to a user as also shown at FIG. 4. A satellite view of a map 902 is shown on the display (map views may be toggled by user by selecting the map icon 903). In one embodiment, the display shows the caliber 904 of the bullet for which the ballistic solution has been processed. A shooter icon 906 indicates the location of the shooter on the map, and one or more target icons 908 show the locations of one or more targets on the map. A solid line 910 is displayed between the shooter icon and at least part of the distance along the projected bullet path to the one or more targets. As described further below with reference to FIG. 10, the MBPDS in one embodiment utilizes a solid line to graphically represent that portion of the bullet's path to the target in which it is considered to have ideal characteristics (within maximum vital range, and having traveled a distance less than Et and Vt). Ballistics solutions information is displayed adjacent to the target icon, although in alternate embodiments, it may be displayed elsewhere on the display. In one embodiment of the MBPDS, the distance between the target and the shooter 912, elevation adjustment 914, and windage adjustment 916 are displayed on the map.

In one embodiment, further graphical representations are displayed on the map, indicating the projected bullet characteristics (as compared to the user-inputted criteria) along the bullet's path from the shooter to a target. The display screen of the MBPDS, communicatively connected to the MBPDS central processor unit, is configured to depict a projected path of said bullet/projectile on a map corresponding to a position of said system, said projected path being displayed on said map using one or more differing types of graphical representations, said one or more differing types of graphical representations being selectively displayed based on a comparison of said projected in-flight characteristics for the bullet/projectile and said one or more in-flight projectile characteristics criteria.

For example, in one embodiment of the MBPDS, the projected bullet path is represented by circles 918 at distances greater than the user-inputted maximum vital range, but still less than the velocity threshold (Vt) and energy threshold (Et). At distances greater than the velocity threshold but less than the energy threshold, the bullet path is represented as a cross or "plus" sign 922. At distances greater than the maximum vital range, velocity threshold, and energy threshold, the bullet path is represented by diamonds 924. It should be noted that colors and shapes chosen to describe the embodiments of the GBCO (Graphical Bullet Characteristic Overlay) utilized by an embodiment of the MBPDS are merely exemplary. It is contemplated that in alternate embodiments of the MBPDS, the graphical representations used in connection with the GBCO may be represented by any number of differing shapes and/or colors.

Figure 10:
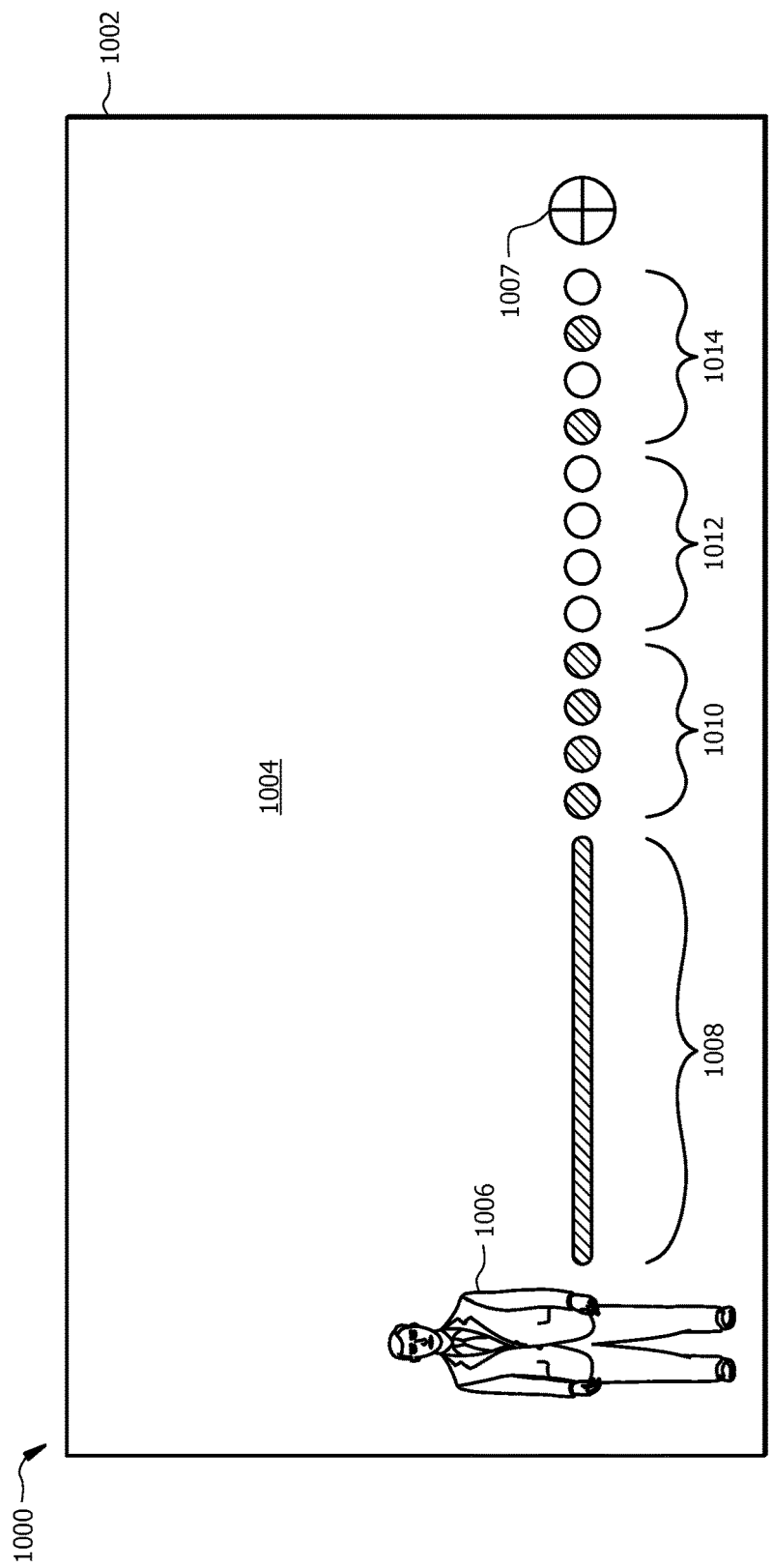
FIG. 10 illustrates an embodiment of graphical representations of approximate in-flight bullet characteristics as displayed by an embodiment of the mobile ballistics processing and display system.

Referring now to FIG. 10, further illustrating an embodiment of graphical representations 1000 of approximate in-flight bullet characteristics as displayed 1002 by an embodiment of the MBPDS as also shown at FIG. 9. A shooter icon 1006 indicates the location of a shooter. A solid line 1008 is displayed between the shooter icon and at least part of the distance along the projected bullet path to the one or more targets. Along that portion of the bullet path (which could be the entire bullet path) that is represented by a solid line, the bullet characteristics are considered ideal to the user, meaning that the bullet meets all specified criteria. In the embodiment described herein, ideal bullet characteristics occur when the distance between the shooter and the bullet is less than the maximum vital range, velocity threshold, and energy threshold. The projected bullet path is represented by solid black circles 1010 at distances greater than the user-inputted maximum vital range, but still less than the velocity threshold (Vt) and energy threshold (Et). At distances greater than the velocity threshold but less than the energy threshold, the bullet path is represented as an unshaded circle or as a circle having a non-black color 1012. At distances greater than the maximum vital range, velocity threshold, and energy threshold, the bullet path is represented by circles having alternating colors or alternating between shaded and unshaded circles 1014. As noted above, it is contemplated that in alternate embodiments of the MBPDS, the graphical representations used in connection with the GBCO may be represented by any number of shapes and/or colors.

Figure 11:
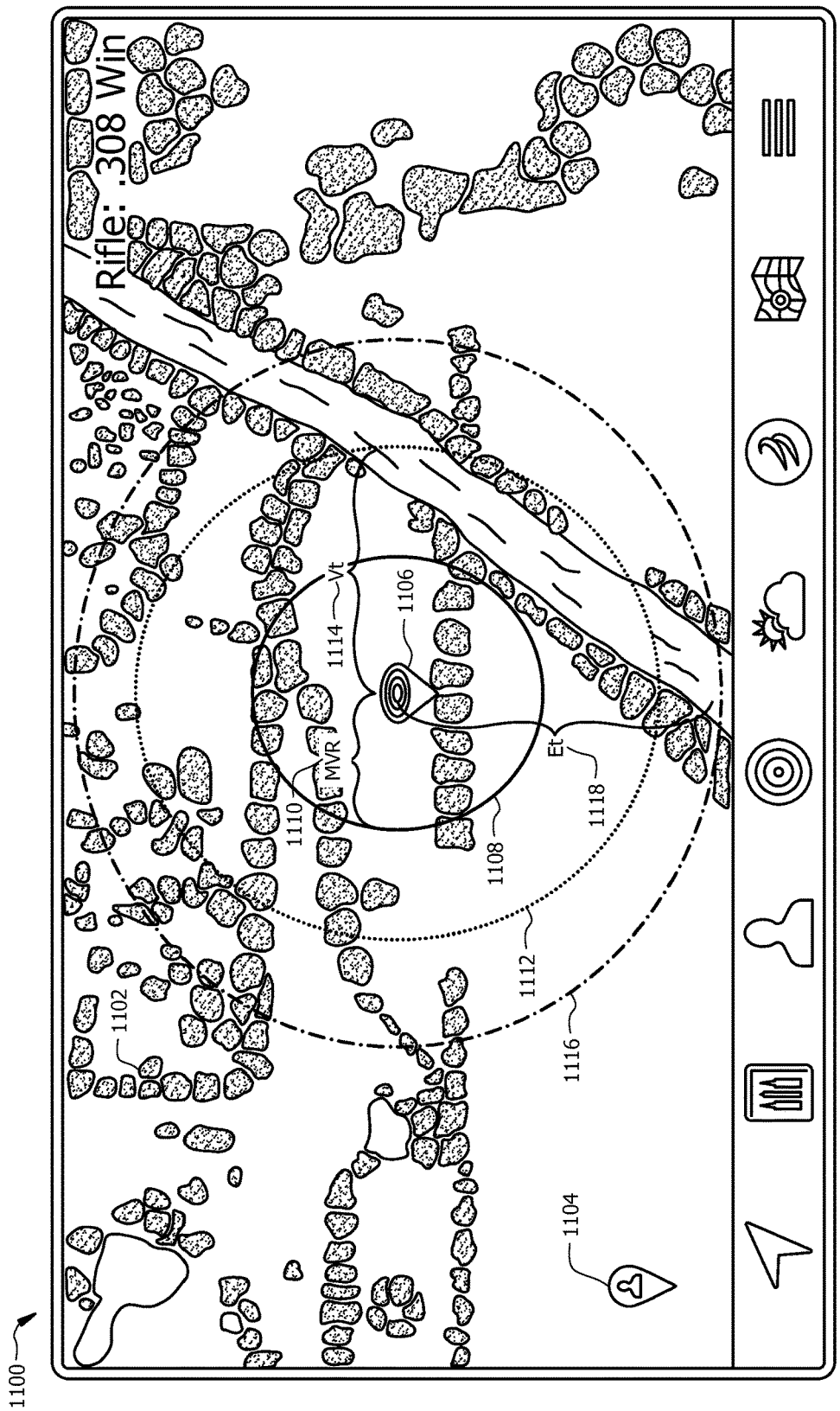
FIG. 11 illustrates a screenshot of a display of an alternate embodiment of the mobile ballistics processing and display system, said display showing graphical representations of boundaries around a target, projecting geographic areas where a projectile will meet, exceed and/or fall below defined in-flight projectile characteristics criteria based on ballistics processing by said mobile ballistics processing and display system.

Referring now to FIG. 11, a screenshot of a display of an alternate embodiment of the MBPDS, said display 1100 showing graphical representations of boundaries around a target, projecting geographic areas where a projectile will meet, exceed and/or fall below defined in-flight projectile characteristics criteria based on ballistics processing by said MBPDS. Based on the ballistics variables of the projectile and other variables such as atmospheric conditions, the MBPDS will be capable of generating data associated with projected in-flight characteristics corresponding to said projectile. Moreover, as previously described above, the MBPDS is configured to receive data associated with one or more in-flight projectile characteristics criteria such as, for example, maximum vital range (MVR), velocity threshold (Vt), and energy threshold (Et). With such information, the MBPDS will be capable of calculating the distances from a particular target, that a projectile will have in-flight projectile characteristics that meet, exceed, and fall below such in-flight projectile characteristics criteria. Utilizing such information, the MBPDS in alternate embodiments, can utilize graphical representations to display locations on an electronic map, where a user may take a shot at a target from to meet such criteria.

Still referring to FIG. 11, the MBPDS is configured to display a map 1102 showing the position of the shooter 1104 and the position of one or more targets 1106 in relation to terrain features and other map features (trees, streams, ponds, streets, buildings, etc.). Using an alternate embodiment of the GBCO, differing graphical representations can be used to indicate areas on the map where the user could take a shot at the target such that his or her bullet would be within certain in-flight characteristics criteria. For example, a particular projectile under particular atmospheric conditions, a circle represented by a solid line may illustrate the area around the target at which the projectile, just at the point-of-impact at the target 1106, would be within MVR, Vt, and Et ("ideal conditions"). Thus, the GBCO would therefore indicate to the user that should a shot be taken outside of the circle 1108, the target is beyond the maximum vital range. The boundaries at which other in-flight projectile characteristics criteria would be met, exceeded, or fall below may be represented by other graphical representations. For example, a dotted line may be used to represent a circular boundary 1112 around the target, defining locations beyond which a shot at the target would result in a projectile having a velocity (at point-of-impact) less than the velocity threshold (Vt) 1114. Similarly, an alternating dashed and dotted line may be used to represent a circular boundary 1116 around the target, defining locations beyond which a shot at the target would result in a projectile having energy (at point-of-impact) less than the energy threshold (Et) 1118. It should be noted that the boundaries corresponding to in-flight characteristics criteria shown in FIG. 11 have been represented as circular for ease of explanation. However, depending on the ballistics variables (including projectile characteristics and atmospheric conditions), the boundaries may not appear circular under actual conditions.

In even further alternate embodiments, the GBCO may be represented using differing colors. For example, a multi-colored heat map, indicating the approximate in-flight bullet characteristics of a bullet at each point on the map display. For example, in one alternate embodiment, an area around a target (corresponding to a ballistics solution) representing shooting locations associated with ideal bullet characteristics, may be indicated by a shaded green color. A separate color shaded around the same target may be used to represent all distances from the target that are greater than the maximum vital range, but less than the velocity threshold and energy threshold. In this manner, an intuitive graphical representation is provided to the user, showing on a map the points to which he or she must be located to take a shot at a target in order for the bullet to have certain in-flight characteristics in the general manner described above with reference to FIG. 11.

Referring now to FIG. 12, a screenshot 1200 of a display of an embodiment of the MBPDS, said display 1202 showing a ballistics table 1204 on which data resulting from ballistics solution processing is displayed. In chart mode, the MBPDS is configured to display ballistics information in incremental distances (range 1206) from the shooter's location to the target. For example, in one embodiment, a column 1212 of the ballistics table indicates the calculated velocity (in units of feet per second) of a bullet in one hundred yard increments from one hundred yards to five hundred yards. Other such information appearing on the ballistics information may include elevation adjustments (in units of inches, MOA, and mil) 1208, windage adjustments (in units of inches, MOA, and mil) 1210, energy (in units of ft/lbs), maximum vital range (in units of inches), and bullet time of flight (ToF) (in units of seconds). It is contemplated that in alternate embodiments of the MBPDS, the ballistics table may display all manner of ballistics and other data that may be useful to a shooter.

It should be noted that the description of the present invention has been presented for purposes of illustration and description, and is not intended to be exhaustive or limited to the invention in the form disclosed. Many modifications and variations will be apparent to those of ordinary skill in the art. The preferred embodiment appearing in the drawings was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims. Moreover, it should be noted that uses of the phrase "the present invention" within this disclosure are not intended to limit or otherwise restrict the scope of the invention(s) disclosed and claimed by the inventor, but said phrase is merely intended to refer to certain examples of embodiments of the invention(s).

What is claimed is:

1. A mobile ballistics processing and display system, said system comprising:
   (a) a central processor unit; and
   (b) at least one display screen communicatively connected to said central processor unit,
   wherein said central processor is configured to allow a user of a firearm to specify a location of a target;
   wherein said central processor unit is configured to receive data associated with one or more bullet ballistics variables associated with the firearm and the user's location to find a ballistic solution to shoot the target;
   wherein said central processor is configured to determine an elevation or windage adjustment to the firearm so that a calculated projectile trajectory of a bullet from the firearm based on the one or more bullet ballistics variables hits the target, said central processor unit being further configured to process said data associated with one or more bullet ballistics variables associated with a projectile to generate data associated with projected in-flight ballistics performance characteristics corresponding to said projectile, wherein said central processor unit is further configured to receive data including one or more in-flight projectile ballistics performance characteristics thresholds, wherein said central processor unit causes the at least one display screen to depict the user's position, the target, the elevation or windage adjustment, and a graphical projectile characteristics overlay along a projected path of said projectile on an overhead view of a map corresponding to a geographic position of said system, by at least:

(i) determining, by said central processor unit, geographic locations and distances of a plurality of portions of said projected path of said projectile, each of said geographic locations and said distances of each of said plurality of portions of said projected path of said projectile being determined by calculating whether said projected in-flight ballistics performance characteristics corresponding to said projectile are greater than or less than said one or more in-flight projectile ballistics performance characteristics thresholds;

(ii) assigning to each of said plurality of portions of said projected path of said projectile, by said central processor unit, one of a plurality of different types of graphical representations; and (iii) aligning and displaying on said at least one display screen, by said central processor unit, said graphical projectile characteristics overlay along a length of said projected path of said projectile on said overhead view of said map, said graphical projectile characteristics overlay comprising said one of a plurality of different types of graphical representations assigned to said plurality of portions of said projected path of said projectile.

2. The mobile ballistics processing and display system of claim 1, further comprising a global positioning system communicatively connected to said central processor unit, said global positioning system configured to transmit positional data to said central processor unit.

3. The mobile ballistics processing and display system of claim 2 wherein said system is configured to transmit, via a network, said positional data to a source for map data, said source for map data transmitting map data associated with said positional data to said ballistics processing and display system for use in displaying said overhead view of said map corresponding to said geographic position of said system.

4. The mobile ballistics processing and display system of claim 3, further comprising one or more input devices, said one or more input devices being communicatively connected to said central processor unit.

5. The mobile ballistics processing and display system of claim 4 wherein one or more of said input devices is selected from the group consisting of a touchscreen, atmospheric sensor, computer mouse, trackpad, touchpad, keyboard, trackball, joystick, and pointing stick.

6. The mobile ballistics processing and display system of claim 5 wherein said atmospheric sensor is capable of collecting atmospheric data selected from a group consisting of one or more of wind speed, wind direction, temperature, atmospheric pressure, relative humidity, and density altitude.

7. The mobile ballistics processing and display system of claim 6 wherein said data associated with one or more ballistics variables associated with a projectile comprises said atmospheric data.

8. The mobile ballistics processing and display system of claim 1, wherein said display includes a touchscreen interface allowing a user to utilize a finger to contact said touchscreen interface to identify one or more target locations on said overhead view of said map.

9. The mobile ballistics processing and display system of claim 8 wherein said one or more target locations on said overhead view of said map identified by said user are used by the system in generating said projected path of said projectile.

10. A mobile computer-implemented method for processing and displaying one or more ballistics solutions, the method comprising the steps of:

(a) receiving, by a central processor unit, data associated with one or more bullet ballistics variables associated with a firearm and a user's location to find a ballistic solution to shoot a target, wherein said central processor unit is configured to allow the user of the firearm to specify a location of the target;

(b) processing, by said central processor unit, said data associated with one or more bullet ballistics variables associated with a projectile;

(c) generating, by said central processor unit, projected in-flight ballistics performance characteristics for said projectile by utilizing said data associated with one or more ballistics variables associated with a projectile, wherein said central processor unit is configured to determine an elevation or windage adjustment to the firearm so that a calculated projectile trajectory of a bullet from the firearm based on the one or more bullet ballistics variables hits the target;

(d) receiving, by said central processor unit, data including one or more in-flight projectile ballistics performance characteristics thresholds;

(e) depicting, on a display communicatively connected to said central processor unit, the user's position, the target, the elevation or windage adjustment, and a graphical projectile characteristics overlay along a projected path of said projectile on an overhead view of a map corresponding to a geographic position of a computer implementing said method by at least:

(i) determining, by said central processor unit, geographic locations and distances of a plurality of portions of said projected path of said projectile, each of said geographic locations and said distances of each of said plurality of portions of said projected path of said projectile being determined by calculating whether said projected in-flight ballistics performance characteristics corresponding to said projectile are greater than or less than said one or more in-flight projectile ballistics performance characteristics thresholds;

(ii) assigning to each of said plurality of portions of said projected path of said projectile, by said central processor unit, one of a plurality of different types of graphical representations; and (iii) aligning and displaying on said at least one display screen, by said central processor unit, said graphical projectile characteristics overlay along a length of said projected path of said projectile on said overhead view of said map, said graphical projectile characteristics overlay comprising said one of a plurality of different types of graphical representations assigned to said plurality of portions of said projected path of said projectile.

11. The mobile computer-implemented method for processing and displaying one or more ballistics solutions of claim 10, further comprising the step of transmitting, from a global positioning system communicatively connected to central processor unit, positional data to said central processor unit.

12. The mobile computer-implemented method for processing and displaying one or more ballistics solutions of claim 11, further comprising the step of transmitting said positional data to a source for map data, said source for map data transmitting map data associated with said positional data to said central processor unit.

13. The mobile computer-implemented method for processing and displaying one or more ballistics solutions of claim 12, wherein said central processor unit is further communicatively connected to one or more input devices.

14. The mobile computer-implemented method for processing and displaying one or more ballistics solutions of claim 13, wherein one or more of said input devices is selected from the group consisting of a touchscreen, atmospheric sensor, computer mouse, trackpad, touchpad, keyboard, trackball, joystick, and pointing stick.

15. The mobile computer-implemented method for processing and displaying one or more ballistics solutions of claim 14, wherein said atmospheric sensor is capable of collecting atmospheric data selected from a group consisting of one or more of wind speed, wind direction, temperature, atmospheric pressure, relative humidity, and density altitude.

16. The mobile computer-implemented method for processing and displaying one or more ballistics solutions of claim 15, wherein said data associated with one or more ballistics variables associated with a projectile comprises said atmospheric data.

17. The mobile computer-implemented method for processing and displaying one or more ballistics solutions of claim 10, further comprising the step of receiving from a user, via said user's contact with a touchscreen interface on said display an identification by said user of one or more target locations on said overhead view of said map.

18. The mobile computer-implemented method for processing and displaying one or more ballistics solutions of claim 17, wherein said one or more target locations on said overhead view of said map identified by said user are used by the system in generating said projected path of said projectile.

19. A non-transitory tangible computer readable medium useful in association with a mobile computer that includes one or more processors and a memory, the non-transitory computer readable medium including computer instructions that are configured to cause the mobile computer, by execution of the computer instructions in the one or more processors from the memory, to process and display one or more ballistics solutions by at least:
  (a) receiving, by said one or more processors, data associated with one or more bullet ballistics variables associated with a firearm and a user's location to find a ballistic solution to shoot a target, wherein said one or more processors are configured to allow the user of the firearm to specify a location of the target;
  (b) processing, by said one or more processors, said data associated with one or more bullet ballistics variables associated with a projectile;
  (c) generating, by said one or more processors, projected in-flight ballistics performance characteristics for said projectile by utilizing said data associated with one or more ballistics variables associated with a projectile, wherein said one or more processors are configured to determine an elevation or windage adjustment to the firearm so that a calculated projectile trajectory of a bullet from the firearm based on the one or more bullet ballistics variables hits the target;
  (d) receiving, by said one or more processors, data including one or more in-flight projectile ballistics performance characteristics thresholds; and
  (e) depicting, on a display communicatively connected to said one or more processors, the user's position, the target, the elevation or windage adjustment, and a graphical projectile characteristics overlay along a projected path of said projectile on an overhead view of a map corresponding to a geographic position of said computer by at least:
    (i) determining, by said one or more processors, geographic locations and distances of a plurality of portions of said projected path of said projectile, each of said geographic locations and said distances of each of said plurality of portions of said projected path of said projectile being determined by calculating whether said projected in-flight ballistics performance characteristics corresponding to said projectile are greater than or less than said one or more in-flight projectile ballistics performance characteristics thresholds;
    (ii) assigning to each of said plurality of portions of said projected path of said projectile, by said one or more processors, one of a plurality of different types of graphical representations; and
    (iii) aligning and displaying on said at least one display screen, by said one or more processors, said graphical projectile characteristics overlay along a length of said projected path of said projectile on said overhead view of said map, said graphical projectile characteristics overlay comprising said one of a plurality of different types of graphical representations assigned to said plurality of portions of said projected path of said projectile,
wherein said display includes a touchscreen interface allowing a user to utilize a finger to contact said touchscreen interface to identify specify one or more target locations on said overhead view of said map.

20. The non-transitory tangible computer readable medium of claim 19 wherein said one or more target locations on said overhead view of said map identified by said user are used by the system in generating said projected path of said projectile.

* * * * *